Jan. 9, 1962 G. S. BROWN 3,015,883
FLANGE ALIGNING TOOL
Filed Dec. 2, 1957 2 Sheets-Sheet 1

INVENTOR.
G. S. BROWN
BY Hudson and Young
ATTORNEYS.

Jan. 9, 1962 G. S. BROWN 3,015,883
FLANGE ALIGNING TOOL
Filed Dec. 2, 1957 2 Sheets-Sheet 2
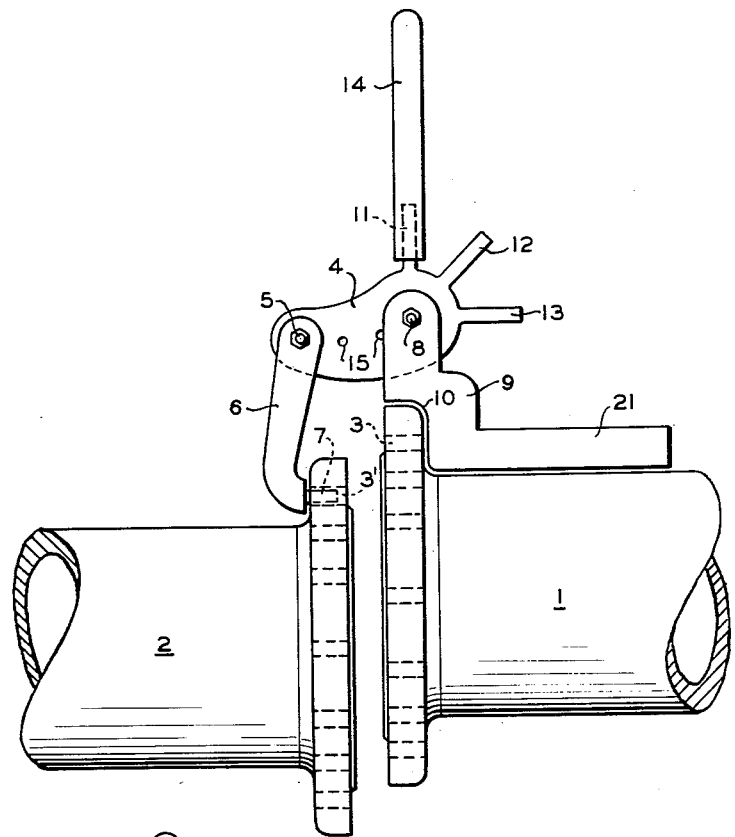
FIG. 5.
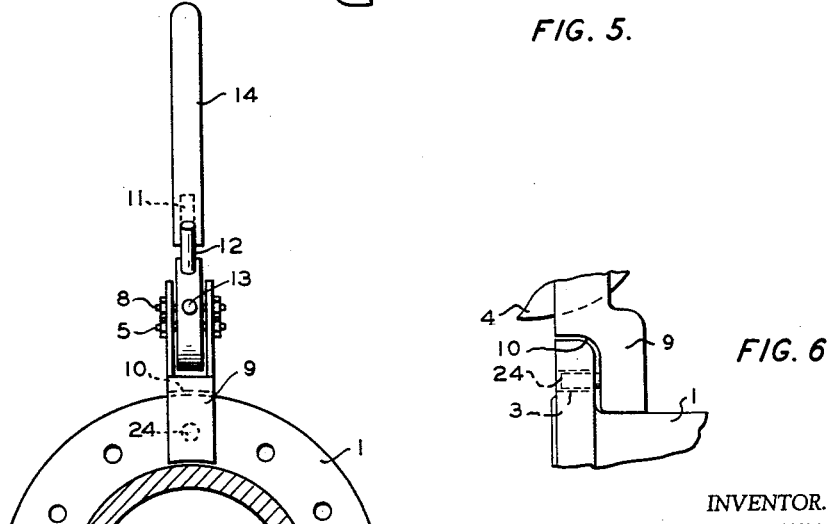
FIG. 4.
FIG. 6
INVENTOR.
G. S. BROWN
BY Hudson and Young
ATTORNEYS.

United States Patent Office 3,015,883
Patented Jan. 9, 1962

3,015,883
FLANGE ALIGNING TOOL
Glenn S. Brown, Bountiful, Utah, assignor to Phillips Petroleum Company, a corporation of Delaware
Filed Dec. 2, 1957, Ser. No. 700,060
6 Claims. (Cl. 29—271)

This invention relates to a tool for aligning flanges. In one aspect it relates to a tool for aligning flanged pipe joints for connecting the flanges.

Most flanged joints must be pulled into position to align the bolt holes so that the bolts can be inserted into the holes in order to make up the flange. Sometimes the restricted working space prevents the use of a spud wrench, which is a wrench having a long tapered handle often used in aligning bolt holes. Oftentimes a spud wrench cannot be used satisfactorily even if the working space is not restricted.

It is, therefore, an object of this invention to provide an aligning tool for aligning the bolt holes in flanges to be joined. It is also an object of this invention to provide an aligning tool for aligning flanges in flanged pipe or conduit joints for joining the pipe sections together. Other objects and advantages of the invention will be apparent to one skilled in the art upon studying the disclosure, including the detailed description and the attached drawings wherein:

FIGURE 4 shows a modification of the invention;

FIGURE 5 shows another modification of the invention; and

FIGURE 6 is another view of the modification of FIGURE 4.

Broadly the invention provides an apparatus capable of aligning flanges for bolting wherein the fixed flange acts as the base for the apparatus and a movable grappling element with a protrusion or pin which fits into a hole of the flange to be aligned is adapted to hold the second flange and raise it into proper alignment for assembling with the fixed flange. The device of this invention enables a single operator to align flanges for assembling, whereas two or more operators have been required before my invention.

Figure 1:
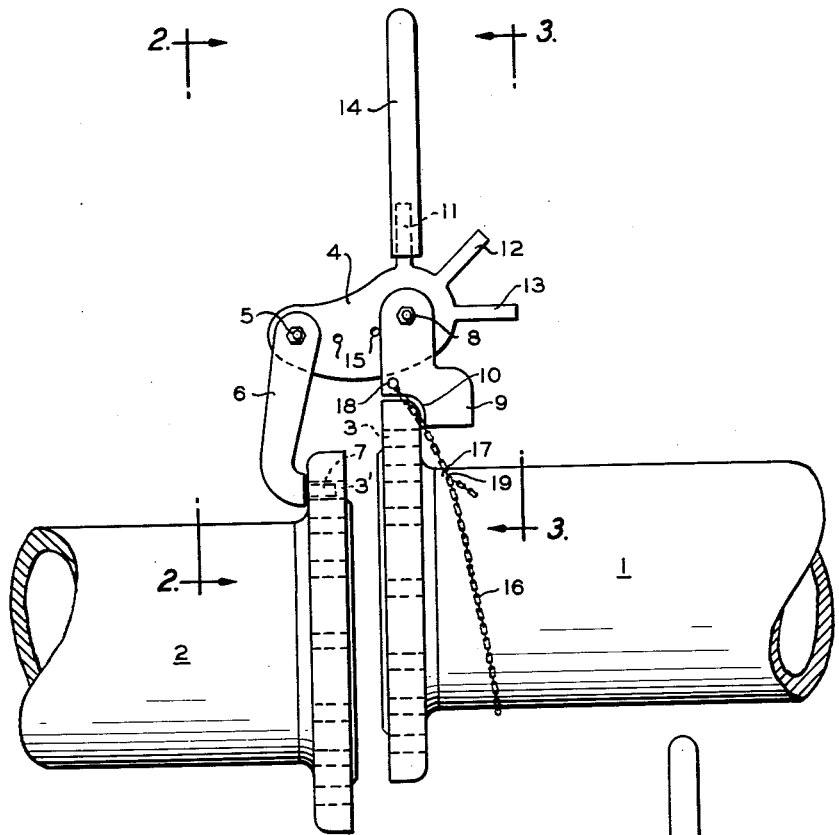
FIGURE 1 shows an embodiment of the invention as it is applied to aligning sections of flanged pipe.
Figure 2:
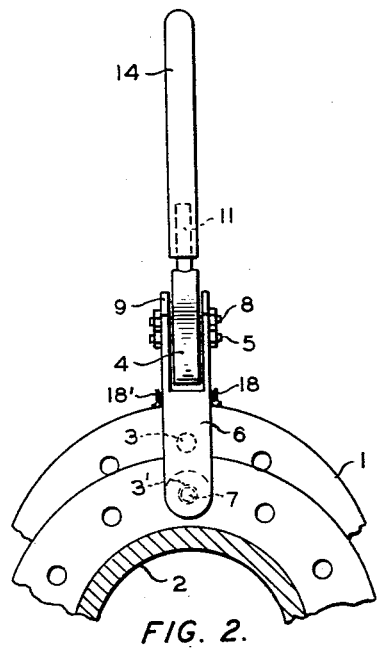
FIGURE 2 is a view of FIGURE 1 along lines 2—2.
Figure 3:
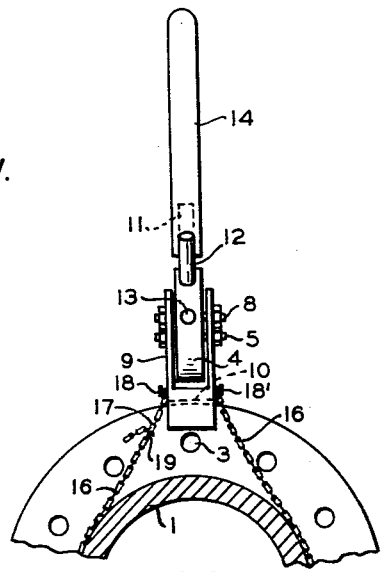
FIGURE 3 is a view of FIGURE 1 along lines 3—3.

Referring now to the drawing and particularly to FIGURE 1, the invention is illustrated as applied to aligning two joints of flanged conduit pipe designated as 1 and 2. Pipe 1 represents the conduit already set in place and pipe 2 represents the section of conduit to be aligned by the tool. Bolt hole 3 in the flange of pipe 1 and bolt hole 3' in the flange of pipe 2 are to be aligned. The remaining cooperating bolt holes fall into alignment when using the aligning tool or can be aligned easily by turning pipe 2. Body 4, having removable pin 5 therethrough is connected to grappling member 6 which is free to move about pin 5 and has protrusion or pin 7 fixed to the end opposite the pivot point and adapted to fit into bolt hole 3' on the flange of pipe 2. Support 9 is pivotally connected by means of pin 8 to body member 4 and has a recessed portion 10 to fit over and rest securely upon the flange of pipe 1. Support member 9 acts as the nonmovable locus of the aligning apparatus. Stubs 11, 12 and 13 are rigidly fixed to body member 4 to receive handle means 14 thereover. Any one of 11, 12 or 13 can be used with handle 14 to actuate the operation of the apparatus. Chains 16 and 17 are secured to pins 18 and 18' of support member 9 and can be secured together by hook member 19. Chains 16 and 17 secure the aligning tool to the flange of pipe 1. Passages 15 are for adjustment wherethrough the removable pin 5 can pass to hold grappling element 6 in a position closer to pin 8 for use with different sizes of flanges.

In the operation of the aligning tool of my invention, the tool is placed so that the recessed portion 10 of support 9 rests on the flange of pipe 1 directly over bolt hole 3, bolt hole 3 being at the upper side of the flange as shown. Handle 14 is pushed forward until protrusion 7 is engaged in bolt hole 3' of pipe 2. Handle 14 is then pulled toward pipe 1, lifting pipe 2 into bolting position. Bolts are then placed in the numerous bolt holes which are now in alignment.

In the modification of FIGURE 4 support 9 has a protrusion 24 adapted for engagement with bolt hole 3 so that the aligning tool is supported firmly on the flange of pipe 1 and prevented from movement while in use by the protrusion 24 which engages bolt hole 3. In this modification chains 16 and 17 are not required.

In the modification shown in FIGURE 5 an extension 21 of support 9 rests upon pipe 1 and prevents movement of the tool while it is being used. In this modification the operator can place his foot upon the extension 21 to provide further stabilization for the aligning tool while in use. In this modification chains 16 and 17 are not required.

It is a feature of my invention that there is provided an apparatus which can be utilized by a single operator and is capable of aligning the flanged ends of pipe for bolting wherein the fixed pipe acts as the base for the apparatus and a movable grappling element is adapted to engage and raise the second flange into proper alignment with the fixed flange for assembling.

Although the invention has been described primarily with respect to aligning the flanged ends of pipe or other conduit, the aligning tool is adapted for use in aligning any two flange members where one of the members acts as the fixed flange and the other flange is aligned therewith. Thus, the tool can be used for aligning pieces of heavy equipment which are assembled by flange connections, such as engine blocks and the like.

The aligning tool will preferably be made of steel for strength and durability; however, special alloys can be employed for specific purposes. As an example, the tool can be made of brass or aluminum for use in connection with steel flanges in areas likely to contain explosive gases so as to avoid the possibility of emitting sparks upon contact of the tool with steel pipe or fittings.

Reasonable variations and modifications are possible within the scope of the disclosure without departing from the spirit and scope of the invention.

That which is claimed is:

1. Apparatus for aligning a substantially vertical fixed flange and a substantially vertical movable flange for bolting together comprising support means adapted to be positioned upon the top portion of said fixed flange in a substantially vertical plane passing through said flange axis and in alignment with a bolt hole in the top portion of said fixed flange, said support means having a bifurcated upper end with holes therethrough; means to secure said support means in said plane and in alignment with said bolt hole at the top portion of said fixed flange; grapple means having one end bifurcated with holes therethrough and a pin fixed to the other end to engage a bolt hole in said movable flange; linkage means pivotally connected to the bifurcation of said support means and to the bifurcation of said grapple means so that the bolt hole engaged by said pin and the bolt hole in alignment with said support means are in alignment when said linkage is rotated about the pivotal connection with said support means; and means to rotate said linkage about the pivotal connection with said support means so as to move the movable flange into alignment with the fixed flange.

2. Apparatus for aligning and adjoining substantially horizontally disposed flanged conduit sections for bolting together comprising a fulcrum support member adapted to be positioned upon the top portion of a fixed flange in a substantially vertical plane passing through said flange axis and in alignment with a bolt hole in the top portion of said fixed flange; means to secure said support member upon the flange of said fixed section of said conduit in said plane; a body member pivotally attached to said support member so as to pivot vertically through an arc normal to the longitudinal axis of said fixed section of conduit and having a plurality of holes therethrough at varying distances from the pivot point opposite the conduit side of said pivot point; a grappling member having one end removably and pivotally connected to said body member by means of the proper one of said holes as determined by the flange dimension; a pin member fixed to the other end of said grappling member and facing said support member and adapted to fit in a bolt hole of a flange of a section of conduit to be aligned with and bolted to the fixed section of conduit; and an extension handle member removably connected to said body member to rotate said body member about its pivot point with respect to the support member whereby the flanged conduit sections are aligned and adjoined for bolting together.

3. Apparatus for lifting, aligning and adjoining at least one bolt hole in each of two boltable flanges positioned in a substantially vertical plane passing through said flange axis comprising a support member adapted to be positioned in said plane upon the top portion of a fixed flange and in alignment with a bolt hole in the top portion of said fixed flanges; means to secure said support member in said plane and in alignment with said bolt hole at the top portion of said fixed flange; a body member pivotally connected to said support member for movement in said plane; a grappling member having one end pivotally connected, for movement in said plane, to said body member at a point adjustably spaced from the pivotal connection of said body member with said support member as determined by the pipe dimension and having a bolt hole engaging means fixed to the other end to engage a bolt hole in a movable flange; and means to rotate said body member about the pivot connecting said body member to said support member until at least one bolt hole in said movable flange is aligned with and adjacent a bolt hole in said fixed flange.

4. The apparatus of claim 3 wherein the means to secure the support member comprises a chain to encircle the member having the fixed flange associated therewith.

5. The apparatus of claim 3 wherein the means to secure the support member comprises a pin extending from said support and adapted to engage a bolt hole in the fixed flange.

6. The apparatus of claim 3 wherein the means to secure the support member comprises an extension of said support member to rest upon the member having the fixed flange associated therewith.

References Cited in the file of this patent
UNITED STATES PATENTS

| | | |
|---|---|---|
| 90,559 | Knott | May 25, 1869 |
| 1,447,190 | Tuttle | Mar. 6, 1923 |
| 1,600,134 | Peterson | Sept. 14, 1926 |
| 1,663,061 | Rich | Mar. 20, 1928 |
| 2,399,312 | Augustine | Apr. 30, 1946 |
| 2,450,151 | McNaughton | Sept. 28, 1948 |
| 2,452,985 | Bourdette | Nov. 2, 1948 |
| 2,585,343 | Newlon | Feb. 12, 1952 |
| 2,712,433 | Holt | July 5, 1955 |

UNITED STATES PATENT OFFICE

CERTIFICATE OF CORRECTION

Patent No. 3,015,883                             January 9, 1962

Glenn S. Brown

It is hereby certified that error appears in the above numbered patent requiring correction and that the said Letters Patent should read as corrected below.

Column 3, line 35, for "flanges" read -- flange --.

Signed and sealed this 3rd day of July 1962.

(SEAL)
Attest:

ERNEST W. SWIDER
Attesting Officer

DAVID L. LADD
Commissioner of Patents